United States Patent

[11] 3,542,355

| [72] | Inventor | Adolph V. Klancnik<br>1020 Glenview Road, Glenview, Illinois 60025 |
|---|---|---|
| [21] | Appl. No. | 726,271 |
| [22] | Filed | April 9, 1968 |
| [45] | Patented | Nov. 24, 1970 |

[54] FIXTURES FOR MACHINE TOOLS
2 Claims, 5 Drawing Figs.

[52] U.S. Cl. .................................................. 269/87.3,
269/34, 269/95, 269/288, 279/4, 77/63
[51] Int. Cl. ...................................................... B25b 1/18,
B23g 3/02
[50] Field of Search .......................................... 269/20, 27,
32—34, 63, 95, 282, 287, 288, 87.1, 87.2, 87.3,
87, 271, 74; 279/4; 77/63

[56] References Cited
UNITED STATES PATENTS

| 652,441 | 6/1900 | McClellan | 269/95X |
|---|---|---|---|
| 2,079,323 | 5/1937 | Kokotiak | 269/74X |
| 2,131,815 | 10/1938 | Nilson | 269/32(I)UX |
| 2,338,060 | 12/1943 | Redmer | 269/32X |
| 2,665,603 | 1/1954 | Hoffman | 269/34 |
| 2,832,395 | 4/1958 | Fisher | 269/282X |

FOREIGN PATENTS

| 578,088 | 6/1924 | France | 269/87 |

*Primary Examiner*—William S. Lawson
*Assistant Examiner*—Leon Gilden
*Attorney*—Kinzer, Dorn and Zickert ABSTRACT: A fixture for facilitating use of a tool includes a plate supporting a work piece holder (collet-type) of a form to grip the work piece when a contracting force is applied thereto. The contracting force is exerted by one end of a lever actuated in turn by fluid under pressure in a cylinder. The end of the plate presents means for locating a tool guide in any one of several different positions, depending upon the nature of the work piece or the portion of the work piece to be engaged by the tool.

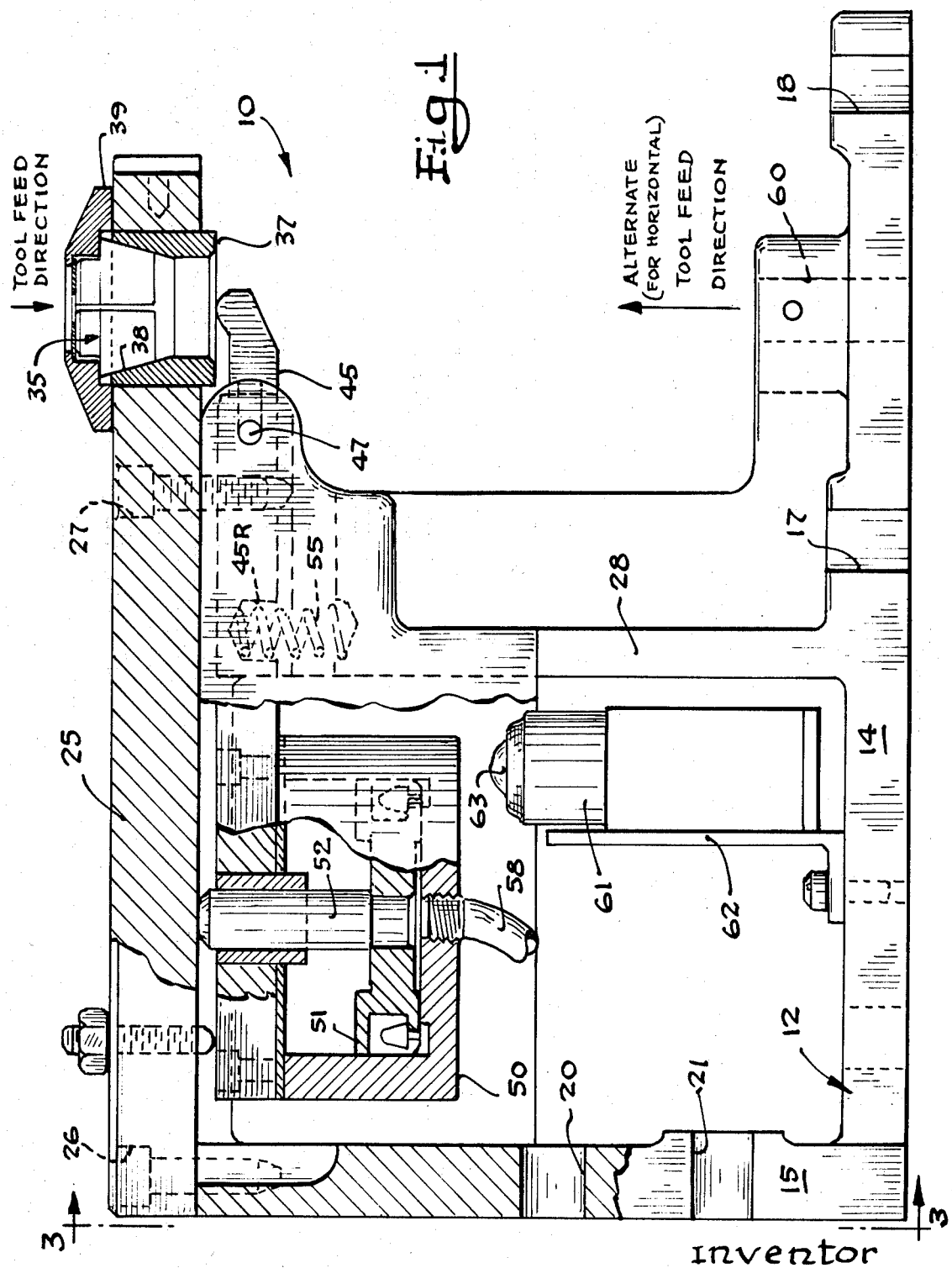

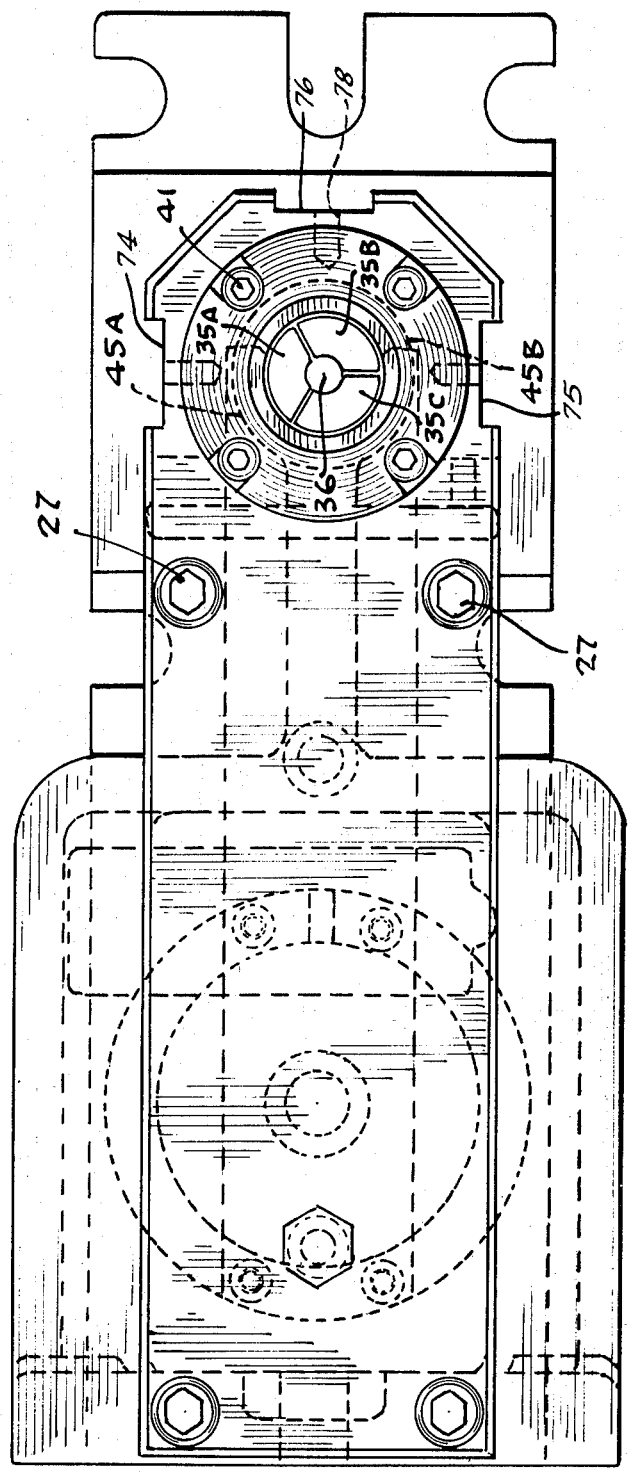

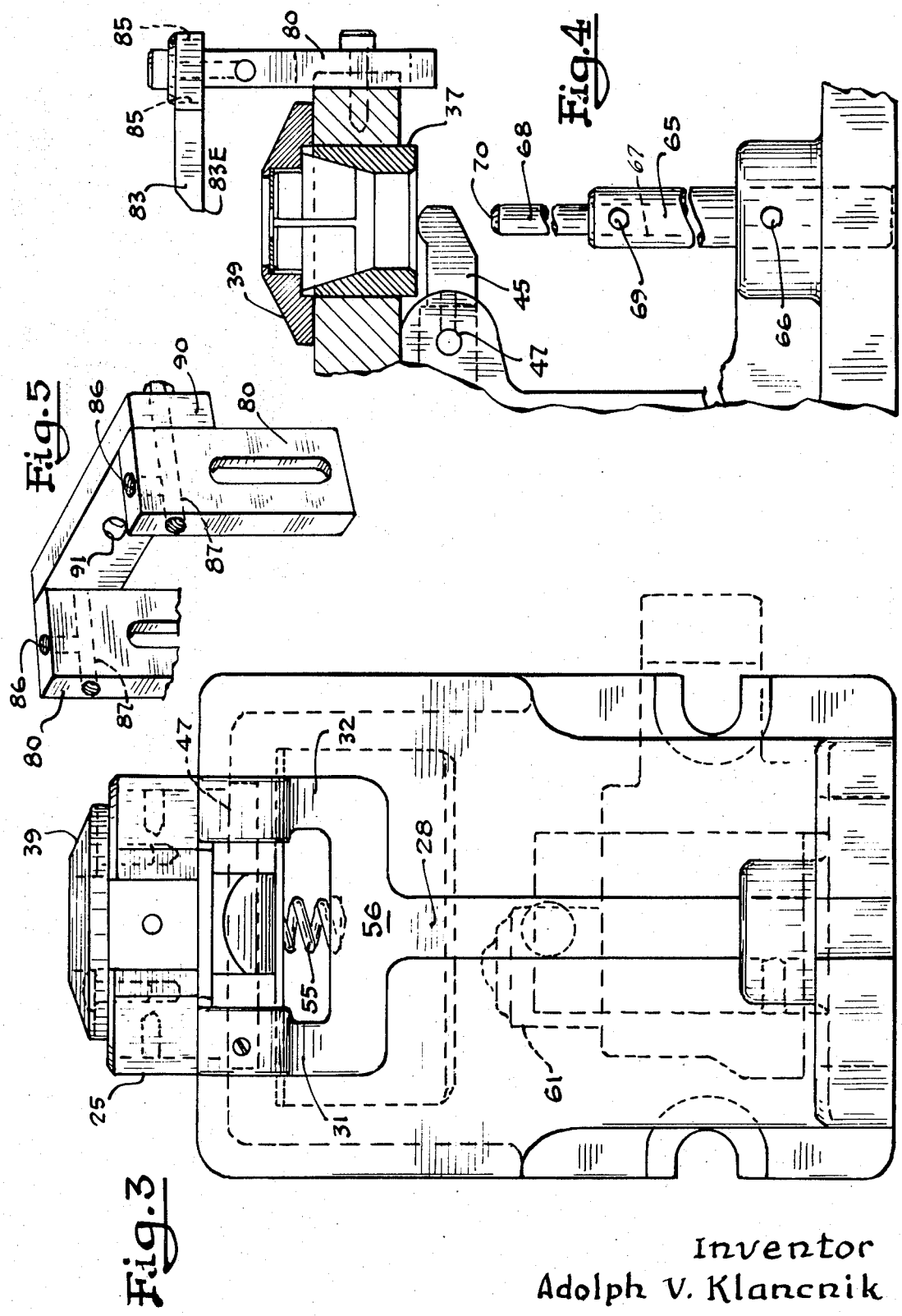

FIXTURES FOR MACHINE TOOLS

The invention relates to a fixture, that is, a device used to firmly hold and present a work piece to a tool during the course of a machining operation.

Machining operations such as milling, boring, tapping, grinding and the like are usually performed while the part undergoing machining is presented to the tool by a so-called fixture, especially in the instance of the manufacture of interchangeable parts to close tolerance allowances. The fixture itself must conform to the machine tool in the sense that the required operation may be performed rapidly and accurately, and in the event that a large number of fixtures are required with any particular tool, this can be significant to the cost of tooling. The primary object of the present invention is to reduce the cost of fixtures by a construction which allows for interchange of work piece holders, different directions of tool feeding and different postures insofar as concerns orientation of the fixture. Thus, the same fixture may be used with different work piece holders and the same fixture may be used with tool feed from various directions.

The foregoing objects are achieved by constructing a fixture with a base supporting a tooling plate equipped with a replaceable work piece holder at one end, the arrangement being such that holders for work pieces of varying diameter may be easily interchanged. Preferably the work piece holder is of the collet type, and the force for contracting the collet about the work piece is transmitted by an air cylinder having universal application in that the fixture may be clamped to a work table or other support in any one of several different working postures. This specific construction represents another object of the present invention, and a related object is to so construct the tooling plate as to enable a tool guide to be oriented in different positions, thereby enlarging the flexibility of the fixture to an even greater degree.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention.

In the drawings:

FIG. 1 is a side elevation of the fixture of the present invention, partly in section;

FIG. 2 is a top plan view of the fixture shown in FIG. 1;

FIG. 3 is an end elevation of the fixture shown in FIG. 2;

FIG. 4 is a fragmentary view showing the use of optional equipment; and

FIG. 5 is a detail perspective view of a tool guide which may be applied to the fixture.

The fixture of the present invention is illustrated at 10 in FIG. 1, and the fixture comprises a base casting 12 which, in the form shown in FIG. 1, presents a bottom plate 14 and a left hand side plate 15. As the fixture is disposed in FIG. 1, the bottom plate 14 would be secured to a bench or some similar supporting part in a machine tool and to this end openings 17 and 18 are formed in the bottom plate for the reception of securing bolts. In this same connection it is to be pointed out that the disposition or attitude of the fixture 10 in FIG. 1 assumes that the direction of tool feed would be on the axis of the upper arrow in FIG. 1.

However, and in accordance with the present invention, the base casting 12 may be turned 90° counterclockwise so that the side plate 15 will become the supporting bottom plate, and again openings 20 and 21 are provided for the necessary securing bolts which will stabilize the fixture in a rigid posture. When the fixture is thus turned, the direction of tool feed will then be horizontal on the alternate axis indicated in FIG. 1.

The fixture includes a sturdy tooling plate 25 supported in an elevated position. The tooling plate is secured in place by fastening screws 26 and 27 having the shanks thereof disposed in the threaded openings respectively formed in the top of the side plate 15 and in the top of a supporting post 28 extending upperly from the base plate 14 parallel to and spaced from the side plate 15. As shown in FIG. 3 the post 28 is of a yoke form at the top, presenting a pair of laterally spaced arms 31 and 32, and these arms have threaded openings for a pair of screws as 27, FIG. 2.

A work piece holder 35 is supported at the outer or right hand end of the tooling plate 25. Specifically the work piece holder is a collet of the usual form having three segments 35A, 35B and 35C, FIG. 2, which together afford a central opening 36 in which the work piece will be positioned to be firmly gripped upon inward contraction of the collet segments. The outer sides of the collet segments are tapered, FIG. 1, and are surrounded by a bushing 37 having a tapered inner wall 38 complementally engaging the assembled segments of the collet.

It will be observed in FIG. 1 that the axis of the collet is on the vertical tool feed axis, and upon delivering a thrust to the bushing 37 in a direction opposite the tool feed direction of the segments of the collet are contracted to rigidly grip the work piece. The collet is secured against any axial movement by a retainer collar 39, which is of circular form, FIG. 2, and which is rigidly held to the upper face of the tooling plate 25 by a plurality of fastening screws 41, FIG. 2.

Displacement of the force applying bushing 37 in the opposite direction is prevented by a lever 45 which normally has the effective end bearing on the underside of the bushing 37. Thus, as shown in FIG. 2, the effective end of the lever 45 is of yoke form presenting a pair of spaced fingers 45A and 45B of arcuate shape having respective portions thereof engaged with diametrically opposite sides of the ring shaped lower surface of the bushing 37. As shown in FIG. 1, the upper surfaces of the yoke end of lever 45 are rounded so as to engage the bushing 37 tangentially, thereby assuring the application of straight line forces when the lever is operated to exert a thrust on the bushing 37.

The lever 45 is located on what amounts to the underside of the tooling plate 25, extending parallel to the tooling plate as well as parallel to the base plate 14. The lever 45 is pivotally mounted on a pin 47 extending between the supporting arms 31 and 32, FIG. 3, and extends rearwardly therefrom in the direction of the side plate 15. An air cylinder 50, FIG. 1, is anchored to the underside of the lever 45, that is, the side of the lever 45 opposite the tooling plate 25. A piston 51 and a piston rod 52 are arranged within the cylinder 50. The end of the rod 52 opposite the end anchored to the piston 51 extends through the lever 45 and bears on the underside of the rigid tooling plate 25.

A strong coil spring 55 has one end disposed in a recess in the bight 56 of the post 28, FIG. 3, which joins the arm 31 and 32. The opposite or upper end of the spring 55 is disposed in a recess in the lever 45, this being the recess 45R, FIG. 1, located between the pivot pin 47 and the piston rod 52. Thus it will be seen that the spring 55 is normally effective to urge lever 45 in a clockwise direction as viewed in FIG. 1.

When air under pressure is admitted to cylinder 50 through the conduit or air line 58, FIG. 1, air under pressure is trapped between the piston 51 and the cylinder 50, whereby the latter is driven downwardly causing lever 45 to pivot counterclockwise against the return action of spring 55. Resultantly, the fingers 45A and 45B of lever 45 exert a thrust on the bushing 37 and this is accompanied by upward movement of the bushing 37 causing the collet to contract about and grip the work piece disposed in the opening 36. It will be appreciated that it is possible under the present invention to substitute different work piece holders or collets to accommodate work pieces of different diameter.

When the work piece is thus gripped, the tool (whether it be a drill or a tap or what have you) may then be advanced in the downward tool feed direction indicated in FIG. 1, incidental to performing the required machining operation. When machining of the work piece has been completed, air is then allowed to bleed from cylinder 50, the lever 45 is retracted by spring 55 and the collet is relaxed allowing the finished work piece to be withdrawn.

In the event that tool feed direction is horizontal rather than vertical, the fixture 14 may be turned 90° counterclockwise as viewed in FIG. 1, elevating the aperture 60 in the base plate 14, thereby allowing the tool to feed through aperture 60 and work from a different direction on what would be the other end of the work piece gripped in holder 35.

If desired a switch 61 may be located adjacent the cylinder 50, being secured in position by a mounting bracket 62 fastened to the base casting. Switch 61 presents a pushbutton 63 in position to be engaged by the cylinder 50 when actuated. Thus the switch 61 may serve as a sensing device for automatically controlling tool feed in response to actuation of the work piece holder.

FIG. 4 illustrates optional equipment with respect to which the fixture is constructed to accommodate. Thus in the instance where the aperture 60 is not used as a tool guide, a post 65 may be mounted therein and anchored by means of a set screw or pin 66. The post 65 is alined with the axis of tool feed and is formed with a recess 67 adapted to receive a stop pin as 68 secured in position by a set screw or similar retainer 69.

Stops as 68 of a selective length may be interchanged and such selective length will present an end stop surface 70 against which the lower end of the work piece, inserted through the collet may be located. Such conditions may prevail, for example, when the tool is fed from the side of the collet along an axis normal to the directional arrows in FIg. 1, incidental to cross drilling a long work piece. The consideration of cross drilling leads to an additional aspect of the present invention as will now be explained.

Referring for the moment to FIG. 2, it will be observed that the end of a tooling plate presenting the collet has three slots formed therein identified by the reference characters 74, 75 and 76. The slots 74 and 75 are on opposite sides of the collet and may be considered as left and right hand mounting slots for a supporting bracket as will be explained. In like manner, the slot 76 may be viewed as a front mounting slot for a bracket, and in all instances a tapped opening as 78 is presented on the inside face of the mounting slot enabling a bracket support screw to be secured therein. The mounting slots are preferably formed inward of the tooling plate but it will be appreciated that equivalent support means may be afforded, and the functional effect will now be described.

Referring to Fig. 4, it will be observed that a support bracket 80 is neatly confined in the front mounting slot 76, being rigidly secured in position by a screw 81. The support bracket 80 extends upwardly above the retainer collar 39 and a stop plate 83 is mounted on top of the bracket 80, itself being rigidly secured thereto by a screw 84. In this connection, attention is directed to FIG. 5 showing another embodiment, where two support brackets as 80 may be used and each instance the bracket is formed with a downwardly extending tapped opening 86 for a mounting screw and is also formed with a cross or transverse opening 87 for a similar purpose. Also each such mounting bracket as 80 has an elongated slot 88 formed in the side thereof enabling the mounting bracket to be adjusted for height.

In the embodiment shown in FIG. 4, the mounting bracket 80 serves the purpose of supporting the stop plate or guide 83, and the length of the stop plate will be such that the effective end 83E thereof is adjacent to the axis of tool feed. Under this circumstance, the end 83E of the stop plate 83 will be sufficiently close to the vertical axis of tool feed as to both enable the tool to work on the upper end of the work piece while the stop surface 83E serves to engage a sufficiently small portion of the upper end of the work piece to accurately locate the work piece. The work piece itself under most instances in this circumstance will be inserted into the collet opening from the bottom, and the post 65 and its stop or locating pin 68 will be removed. In this embodiment, then, the stop 83 may serve as a guide in effect to control the depth to which the hole will be drilled in the upper end of the work piece, and the bracket 80 may be provided with an aperture serving as a tool guide so that the tool can be fed in a horizontal direction rather than a vertical direction. Also, the stop plate 83 is formed with an enlarged aperture 85 which allows for an adjustment relative to the vertical axis of tool feed.

FIG. 5 is a perspective view of the circumstance prevailing when the two bracket mounting slots 74 and 75 are used. Here, one bracket 80 will be located in the slot 74 and the other bracket 80 will be located in the slot 75. A bushing plate or tool guide 90 spans the two brackets 80 and is secured in position by using the screw sockets 87. The bushing plate 90 is provided with a central aperture 91 serving as a tool guide for horizontal feeding. The bushing plate rather than being in the position shown in FIG. 5 may be set on top of the brackets 80, being secured in place by using the screw sockets 86, and in this instance the bushing plate 90 will have the tool guide opening 91 alined on the vertical axis of tool feed.

It will be seen from the foregoing that the fixture of the present invention has a base with two alternate supporting sides allowing the same fixture to accommodate either vertical or horizontal tool feeding. By providing the tooling plate 25 with bracket support means located on different sides of the work piece holder, tool feed of different kinds may again be accommodated by the same fixture, and at the same time a bottom stop (pin 68) or a top stop (plate 83) may be used alternately.

The tooling plate supports a contractible work piece holder, and the work piece may be effectively gripped therein as a result of a lever instituting the contracting action, the lever itself being neatly arranged on one side of the tooling plate and itself actuated by a cylinder containing fluid under pressure mounted on the lever with the rod of the cylinder bearing on the tooling plate.

Hence while I have illustrated and described preferred embodiments, changes and alterations may be made therein without departing from the scope of the appended claims.

I claim:

1. A fixture comprising a base having two alternate sides either of which may be secured to a main support, said base having a tooling plate thereon extending parallel to one of said sides, a work piece holder mounted on said plate for gripping a work piece positioned therein on a vertical axis when one side of the base is secured to said support; means for applying a force to the work piece holder to grip the work piece, said plate being provided with bracket support means on different sides of the work piece holder enabling a bracket-supported guide to be located on selectively different sides of the work piece holder; and said one side having an opening therein coaxial with said axis and enabling a tool to move therethrough when the other side of the base is secured to the support so that the tool approaches a work piece in the holder along a horizontal axis, said opening also enabling a stop pin to be supported therein on an axis coaxial with the axis of said opening.

2. A fixture according to claim 1 in which the work piece holder is a collet and in which the means for applying a force to the collet includes a wedging bushing and a cylinder actuated lever for exerting a thrust on said bushing.